( 12 ) United States Patent
Kikinis

(10) Patent No.: US 7,386,875 B2
(45) Date of Patent: Jun. 10, 2008

(54) FREEZING LIVE VIDEO FRAMES WITH INTERACTIVE LINKS

(75) Inventor: Dan Kikinis, Saratoga, CA (US)

(73) Assignee: JLB Ventures, LLC, Washington, DC (US)

( * ) Notice: Subject to any disclaimer, the term of this patent is extended or adjusted under 35 U.S.C. 154(b) by 1061 days.

(21) Appl. No.: 10/087,778

(22) Filed: Mar. 1, 2002

(65) Prior Publication Data

US 2002/0124264 A1    Sep. 5, 2002

Related U.S. Application Data

(60) Provisional application No. 60/273,207, filed on Mar. 2, 2001.

(51) Int. Cl.
H04N 7/16 (2006.01)
H04N 7/173 (2006.01)

(52) U.S. Cl. .................. 725/136; 725/109; 725/110; 725/112; 725/113

(58) Field of Classification Search ......... 725/135–139
See application file for complete search history.

(56) References Cited

U.S. PATENT DOCUMENTS

| 4,621,259 | A | 11/1986 | Schepers et al. |
|---|---|---|---|
| 5,243,418 | A | 9/1993 | Kuno et al. |
| 5,414,773 | A | 5/1995 | Handelman |
| 5,479,268 | A | 12/1995 | Young et al. |
| 5,485,197 | A | 1/1996 | Hoarty |
| 5,532,754 | A | 7/1996 | Young et al. |
| 5,550,576 | A | 8/1996 | Klosterman |
| 5,684,525 | A | 11/1997 | Klosterman |
| 5,704,837 | A | 1/1998 | Iwasaki et al. |
| 5,724,492 | A | 3/1998 | Matthews, III et al. |
| 5,737,028 | A | 4/1998 | Bertram et al. |
| 5,751,282 | A | 5/1998 | Girard et al. |
| 5,808,613 | A | 9/1998 | Marrin et al. |
| 5,818,441 | A | 10/1998 | Throckmorton et al. |
| 5,828,945 | A | 10/1998 | Klosterman |
| 5,841,563 | A | 11/1998 | Effenberger |
| 5,900,915 | A | 5/1999 | Morrison |
| 5,923,362 | A | 7/1999 | Klosterman |
| 5,926,168 | A | 7/1999 | Fan |
| 5,929,849 | A | * 7/1999 | Kikinis ...................... 725/113 |
| 5,940,073 | A | 8/1999 | Klosterman et al. |
| 5,956,456 | A | 9/1999 | Bang et al. |
| 5,977,964 | A | 11/1999 | Williams et al. |
| 5,999,167 | A | 12/1999 | Marsh et al. |

(Continued)

Primary Examiner—Vivek Srivastava
Assistant Examiner—Fred Peng
(74) Attorney, Agent, or Firm—Banner & Witcoff, Ltd

(57) ABSTRACT

An embodiment of the present invention allows a user to maintain the display of a video frame containing one or more interactive links while also maintaining access to the links. Thus allowing the user to select and examine any desired links at his own pace. For one embodiment, the display of a video frame is maintained by interrupting the refreshing of the frame buffer and the interactive link stream. Interrupting both the frame buffer refresh and the interactive link stream refresh results in the frame being "frozen" along with its associated links. For one embodiment, pressing a button on a control device effects the interruption of the frame buffer refresh and the interactive link refresh. The button may toggle to resume the video display. Alternatively, or additionally, the video display may resume if no action is taken in regard to the interactive links within an specified time.

17 Claims, 3 Drawing Sheets

U.S. PATENT DOCUMENTS

| | | | |
|---|---|---|---|
| 5,999,187 A | 12/1999 | Dehmlow et al. | |
| 6,002,403 A | 12/1999 | Sugiyama et al. | |
| 6,029,195 A | 2/2000 | Herz | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,167,188 A | 12/2000 | Young et al. | |
| 6,205,485 B1 | 3/2001 | Kikinis | |
| 6,233,389 B1 | 5/2001 | Barton et al. | |
| 6,243,039 B1 | 6/2001 | Elliot | |
| 6,271,831 B1 | 8/2001 | Escobosa et al. | |
| 6,349,410 B1 * | 2/2002 | Lortz | 725/110 |
| 6,381,748 B1 * | 4/2002 | Lin et al. | 725/109 |
| 6,757,906 B1 * | 6/2004 | Look et al. | 725/45 |
| 7,017,173 B1 * | 3/2006 | Armstrong et al. | 725/87 |
| 2002/0013950 A1 * | 1/2002 | Tomsen | 725/109 |
| 2005/0097622 A1 * | 5/2005 | Zigmond et al. | 725/135 |

* cited by examiner

FREEZING LIVE VIDEO FRAMES WITH INTERACTIVE LINKS

CLAIM OF PRIORITY

This application is related to, and hereby claims the benefit, of provisional application Ser. No. 60/273,207, filed Mar. 2, 2001 and is hereby incorporated by reference.

FIELD OF THE INVENTION

The present invention relates generally to live video containing interactive links and more specifically to methods and apparatuses for accessing such interactive links.

BACKGROUND OF THE INVENTION

Interactive TV allows interactive links to be embedded in live video. Such interactive links allow a user access to a variety of information. This information may include audio, visual, or text information and may be related to the video program in which it appears and/or may be commercial in nature. As interactive TV progresses, more and more programs will have interactive links embedded in live video, as differentiated from links embedded in static screens. And as technology further develops, not only will a single link be embedded in a video scene, but even numerous, multiple links may be embedded in a video scene. Furthermore, because the links may be embedded in live-action video, the links will be dynamic and some may only be displayed for a short time. Such live-action video with multiple embedded links may be designed for a system having a highly interactive pointer device that would allow a user to access the links quickly. However, a system having a set-top box that uses arrow keys to move a cursor may not be able to select a link during the limited time the link is displayed.

Even if a system has a highly interactive pointer device, such as a mouse, trackball, or similar device, it may be difficult for a user to follow a link in real time if the link represents, for example, a football player running across the screen, due to the speed of the moving image.

SUMMARY OF THE INVENTION

A method and apparatus wherein the display of a frame of a live video presentation is maintained. The frame has one or more interactive links associated with it. Access to the interactive links associated with the frame is maintained such that a user may review and access any of the interactive links.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

An embodiment of the present invention allows a user to maintain the display of a video frame containing one or more interactive links while also maintaining access to the links. The user may then, at his own pace, select and examine any desired links. For one embodiment, the display of the video frame is maintained by interrupting the refreshing of the frame buffer and the interactive link stream. Interrupting both the frame buffer refresh and the interactive link stream refresh results in a frame being "frozen" and the associated links being frozen as well. For one embodiment, pressing a button on a control device effects the interruption of the frame buffer refresh and the interactive link refresh. Such a button may toggle to resume the video display when the user desires. Alternatively, or additionally, the video display may resume if no action is taken in regard to the interactive links within a specified time.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
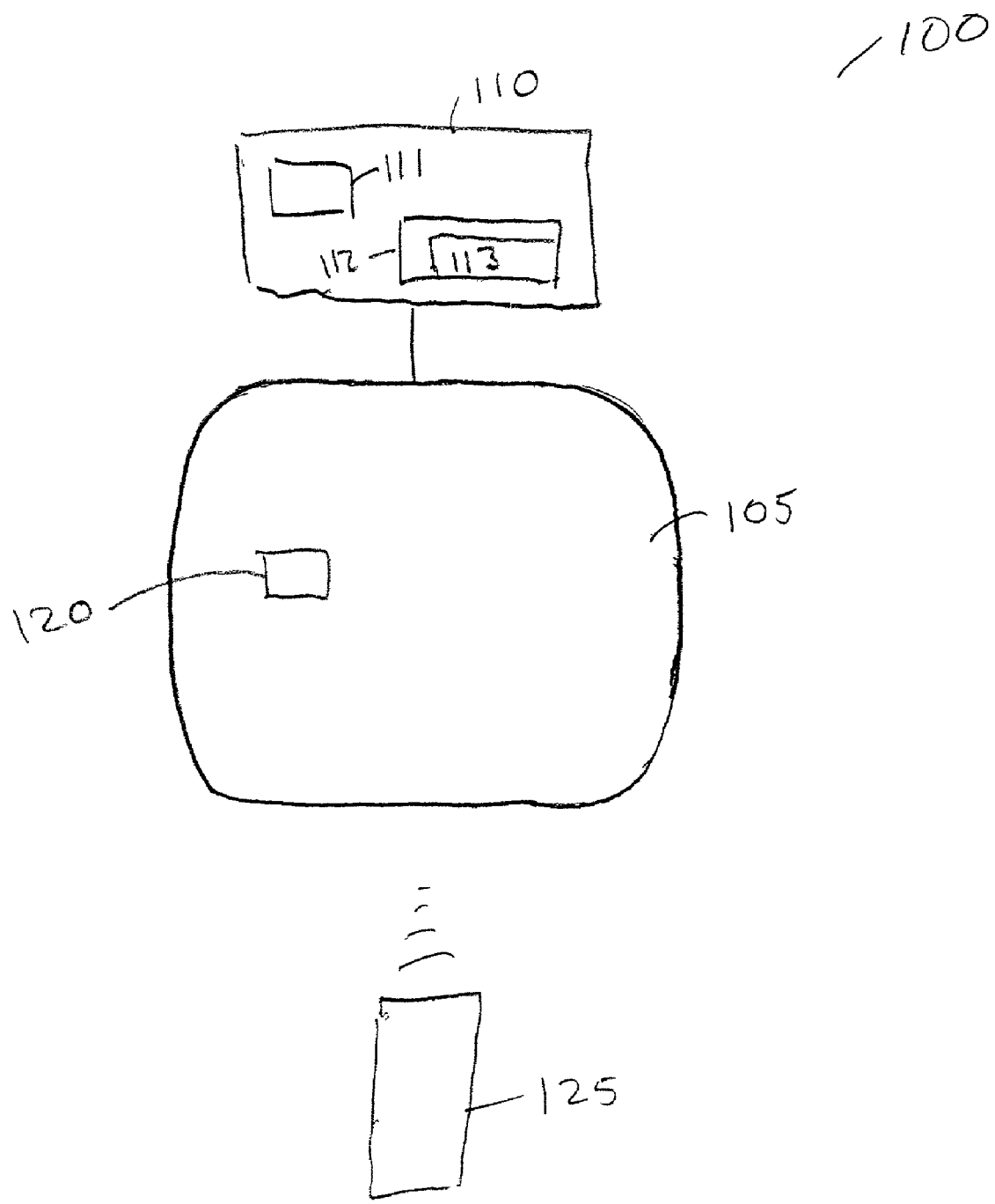
FIG. 1 illustrates a block diagram of an exemplary system for use with one embodiment of the present invention.

FIG. 1 illustrates a block diagram of an exemplary system for use with one embodiment of the present invention. System 100, shown in FIG. 1, includes a presentation device 105 coupled to a set-top box 110. Display device 105 may be a television monitor or some other, similar display device. Set-top box 110 may typically contain a processor 111 and a memory 112, the memory 112 having stored thereon software 113 for implementing the present invention. The set-top box typically receives a video stream from a network connection (not shown) and delivers the video stream to the display device 105. The network connection may be digital cable, fiber optic, digital subscriber line (DSL), aerial, wireless cable, fiber, local multi-channel distribution systems (LMDS), etc., all of which are well-known in the art. System 100 also includes a hyperlink 120 and a remote control 125, typically controlling the set-top box 110, with which the user can activate hyperlink 120. In alternative embodiments, remote control 125 may be integrated with a TV, VCR, DVD player, or other presentation devices or combinations thereof. It will be clear to a person who is skilled in the art that there may be a wide variety of combinations of set-top box, TV, monitor, projector, integration units with or without VCR, PVR, DVD, CD, and other similar devices, all of which may be used for viewing and interacting with interactive TV programs, recorded media, etc.

Figure 2:
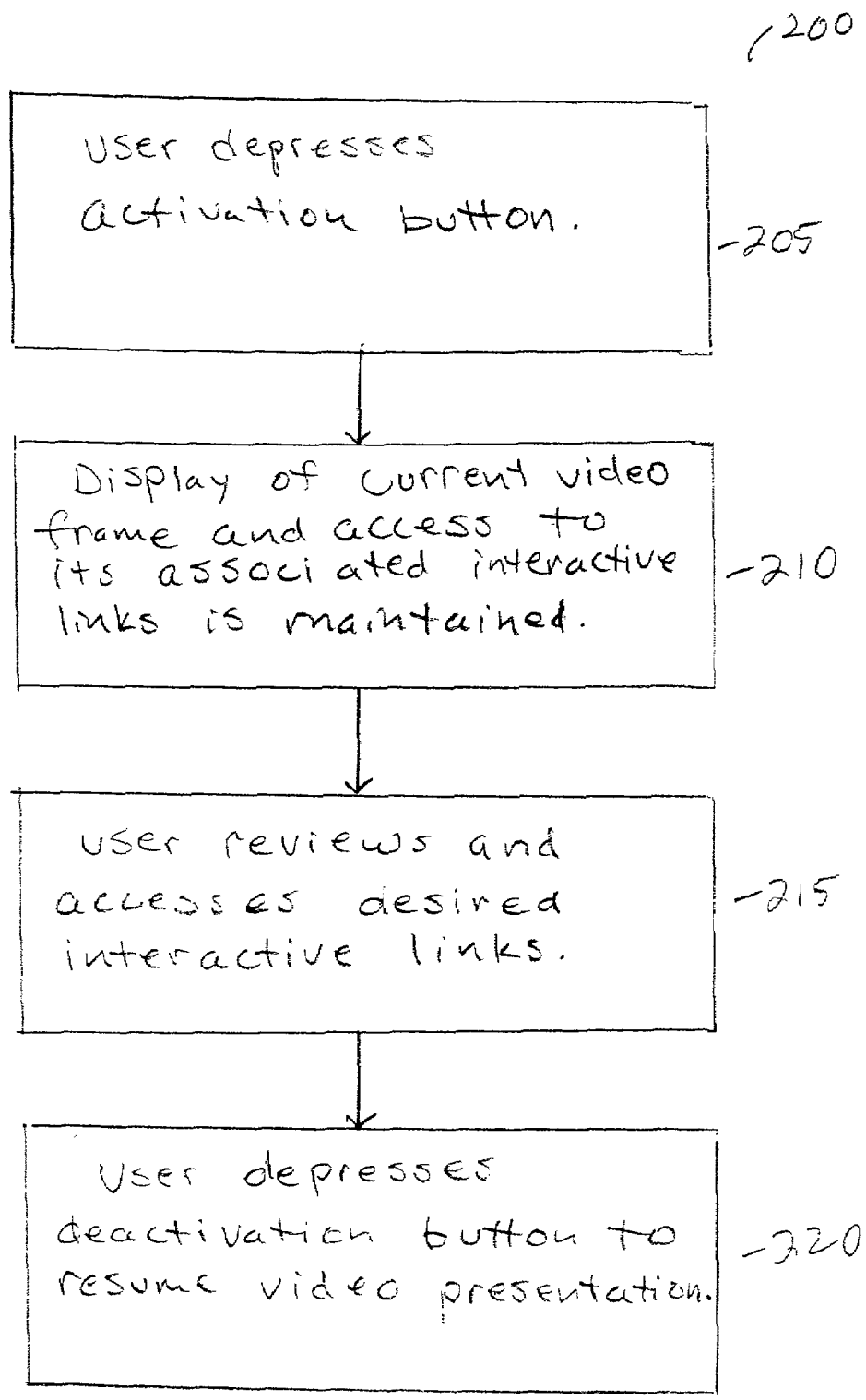
FIG. 2 is a process flow diagram in accordance with one embodiment of the present invention.

FIG. 2 is a process flow diagram in accordance with one embodiment of the present invention. Process 200, shown in FIG. 2, begins with operation 205 in which a user, wishing to review and/or access one or more interactive links, depresses an activation button on a control device. The button may be incorporated within a presentation device or may be on a remote control that controls such a device.

This causes the system to "freeze" the current video frame and its associated interactive links at operation 210. That is, the system maintains the display of the current video frame, and interactive links associated with this frame remain accessible. For one embodiment, freezing the current video frame and its associated interactive links is effected by interrupting the refresh to the frame buffer and the interactive link stream.

At operation 215, the user may now review and access the interactive links as desired. The selected video frame and its associated interactive links will be maintained long enough for the user to navigate to, and access, desired interactive links. During the time a particular video frame is frozen the video presentation continues and the user misses that segment of the video presentation. Alternatively, the frozen video frame and its associated interactive links are stored and may be reviewed at a later time, so that the user may continue to view the ongoing video presentation uninterrupted. That is, the user may defer review of the interactive links until a more convenient time, for example, during the next advertising block or after the video presentation.

At operation 220, the user depresses a deactivation button on the control device to resume the video presentation. For one embodiment the user may depress the same button to resume the video presentation as was pressed to freeze the particular frame (i.e., the button acts as a toggle to freeze and resume the video). For one embodiment, the video may resume automatically after a specified time if the user has not accessed an interactive link.

As described above, the display of a specified video frame and access to its associated interactive links are maintained in response to a user action (e.g., depressing an activation button), however in alternative embodiments a particular video frame and its associated interactive links may be stored automatically for later use. For example, a system may provide the user with the ability to review and access a certain number of interactive links in real time. For one embodiment, if the number of interactive links presented is greater than that which can be handled in real time, a "snapshot" of the frame and its associated interactive links is automatically stored for later use.

The operations of freezing a particular video frame and its associated interactive links, as described above in reference to FIG. 2, may be implemented by hardware and/or software contained within the set-top box 110. For example, a set-top box may include one or more processors that can execute code or instructions stored within a machine-readable medium that may also be included within the set-top box.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 3:
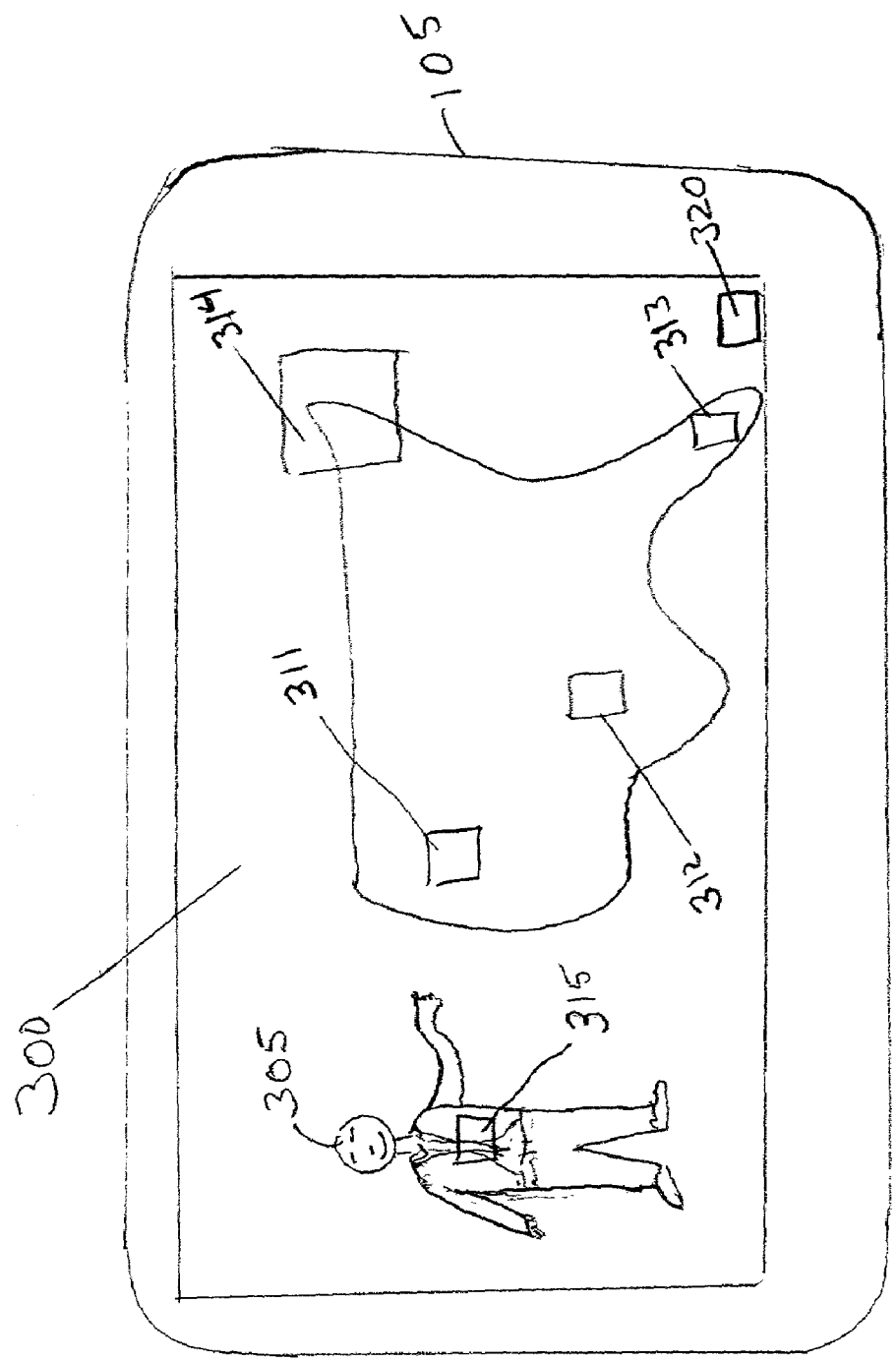
FIG. 3 illustrates an exemplary display on a presentation device implementing one embodiment of the present invention.

FIG. 3 illustrates an exemplary display on a presentation device implementing one embodiment of the present invention. FIG. 3 shows an image 300 on the presentation device 105 in the system 100, described in FIG. 1. Image 300 comprises a weatherperson 305, discussing a map of the USA. The map shows various areas of interest, each with its own interactive link, such as the West with link 311, the Southwest with link 312, Florida with link 313, and the Northeast with link 314. Weatherperson 305 also has an interactive link 315. For example, in many cases such television performers wear clothing furnished by stores as a promotional advertisement. Hence the weatherperson may be linked to the store's website, to sell the clothing worn by the weatherperson on the broadcast.

As the weatherperson moves about through various areas of the screen rather quickly, and the camera follows the moving weatherperson and also focuses on different areas of the map, it is difficult for the user to review and access the interactive links. In accordance with an embodiment of the present invention, the user freezes a particular frame (e.g., a frame containing image 300) and its associated interactive links (e.g., links 311-315). The user may do this by depressing a specific button on remote control 125.

For one embodiment, an indicator 320, as shown in FIG. 3, appears on the display, showing that the frame is frozen. The user can now either make the links visible or not, as desired by, for example, pressing a designated button on his remote control (not shown). The user may then peruse and access one or more links as desired, without having to fear that any links may be lost. In alternative embodiments the links may be forced into a visible state automatically when the freeze frame function is activated, without requiring further user interaction.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   computing the number of interactive links associated with a frame of a live video presentation;
   while displaying the frame of the live video presentation, automatically storing for later use the frame of the live video presentation when the number of interactive links associated with the frame of the live video presentation is greater than a number of interactive links which can be reviewed and assessed by a user in real-time;
   maintaining the display of the automatically stored frame of the live video presentation, the automatically stored frame having associated therewith at least one interactive link; and
   maintaining access to the at least one interactive link associated with the automatically stored frame such that a user may review and access the at least one interactive link.

2. The method of claim 1, wherein displaying the automatically stored frame of the live video presentation, maintaining the display of the automatically stored frame and maintaining access to the at least one interactive link are done in response to a user action.

3. The method of claim 2, wherein the user action is depressing an activation button on a control device.

4. The method of claim 3 further comprising:
   depressing a deactivation button to stop displaying the automatically stored frame of the live video presentation and return to the live video presentation.

5. A method comprising:
   computing the number of interactive links associated with a frame of a live video presentation;
   determining that the number of interactive links associated with the frame of the live video presentation is greater than a number of interactive links which can be reviewed and accessed by a user in real-time and:
      automatically interrupting a frame buffer such that the live video presentation is interrupted and a display of the frame of the live video presentation is maintained, the frame having associated therewith at least one interactive link; and
      automatically interrupting an interactive link stream such that access to the at least one interactive link associated with the frame is maintained.

6. The method of claim 5 further comprising:
depressing a deactivation button to stop displaying the frame of the live video presentation and return to the live video presentation.

7. The method of claim 5, wherein the frame and the at least one interactive link are stored for later use such that access to the at least one interactive link is maintained.

8. One or more computer-readable media containing instructions that, when executed by a processor, cause the processor to perform a method, the method comprising:
computing the number of interactive links associated with a frame of a live video presentation;
while displaying the frame of the live video presentation, automatically storing for later use the frame of the live video presentation when the number of interactive links associated with the frame of the live video presentation is greater than a number of interactive links which can be reviewed and assessed by a user in real-time;
maintaining the display of the automatically stored frame of the live video presentation, the automatically stored frame having associated therewith at least one interactive link; and
maintaining access to the at least one interactive link associated with the automatically stored frame such that a user may review and access the at least one interactive link.

9. The one or more computer-readable media of claim 8, wherein displaying the automatically stored frame of the live video presentation, maintaining the display of the automatically stored frame and maintaining access to the at least one interactive link are done in response to a user action.

10. The one or more computer-readable media of claim 9, wherein the user action is depressing an activation button on a control device.

11. The one or more computer-readable media of claim 10 further comprising:
depressing a deactivation button to stop displaying the automatically stored frame of a live video presentation and return to the live video presentation.

12. One or more computer-readable media storing instructions that, when executed by a processor, cause the processor to perform a method, the method comprising:
computing the number of interactive links associated with a frame of a live video presentation;
determining that the number of interactive links associated with the frame of the live video presentation is greater than a number of interactive links which can be reviewed and accessed by a user in real-time and:
automatically interrupting a frame buffer such that a live video presentation is interrupted and a display of the frame of the live video presentation is maintained, the frame having associated therewith at least one interactive link; and
automatically interrupting an interactive link stream such that access to the at least one interactive link associated with the frame is maintained.

13. The one or more computer-readable media of claim 12, wherein the automatically interrupted frame and the at least one interactive link are stored for later use such that access to the at least one interactive link is maintained.

14. An apparatus comprising:
a processor having a memory coupled thereto, the memory having stored thereon executable instructions which, when executed by the processor, cause the processor to compute the number of interactive links associated with a frame of a live video presentation, while displaying the frame of the live video presentation automatically store for later use a frame of the live video presentation when the number of interactive links associated with the frame of the live video presentation is greater than the number of interactive links which can be reviewed and accessed by a user in real-time, display the automatically stored frame of the live video presentation, maintain the display of the automatically stored frame of the live video presentation, the automatically stored frame having associated therewith at least one interactive link, and maintain access to the at least one interactive link associated with the automatically stored frame such that a user may review and access the at least one interactive link.

15. The apparatus of claim 14, further comprising;
a control device, the control device having an activation mechanism to initiate execution of the executable instructions.

16. The apparatus of claim 15, wherein the control device has a deactivation mechanism to stop displaying the automatically stored frame of the live video presentation and return to the live video presentation.

17. A system comprising:
a video presentation device, the video presentation device capable of displaying a live video presentation; and
a control device to compute the number of interactive links associated with a frame of the live video presentation, while displaying the frame of the live video presentation on the video presentation device automatically store for later use the frame of the live video presentation when the number of interactive links associated with the frame of the live video presentation is greater than a number of interactive links which can be reviewed and accessed by a user in real-time, display the automatically stored frame of the live video presentation, maintain the display of the automatically stored frame of the live video presentation, the automatically stored frame having associated therewith at least one interactive link, and maintain access to the at least one interactive link associated with the automatically stored frame such that a user may review and access the at least one interactive link.

* * * * *